United States Patent [19]
Tsukamoto et al.

[11] Patent Number: 5,591,273
[45] Date of Patent: Jan. 7, 1997

[54] PROCESS FOR DISTRIBUTING ULTRA HIGH PURITY GASES WITH MINIMIZED CONTAMINATION AND PARTICULATES

[75] Inventors: Toshiyuki Tsukamoto, Ushiku; Norbert Fanjat, Tsukuba; Jean Friedt, Tokyo, all of Japan

[73] Assignee: L'Air Liquide, Societe Anonyme pour l'Etude et l'Exploitation des Procedes Georges Claude, Paris, France

[21] Appl. No.: 366,468

[22] Filed: Dec. 30, 1994

[51] Int. Cl.⁶ .................. B08B 3/04; B08B 5/00; B08B 5/04; B08B 9/00
[52] U.S. Cl. ............. 134/21; 134/22.14; 134/22.18; 134/22.19; 134/25.4; 134/26; 134/30
[58] Field of Search ................... 134/21, 22.14, 134/22.18, 22.19, 25.4, 26, 30

[56] References Cited

U.S. PATENT DOCUMENTS

| | | | |
|---|---|---|---|
| 5,092,937 | 3/1992 | Oqura et al. | 134/30 |
| 5,330,652 | 7/1994 | Goldman et al. | 210/618 |

Primary Examiner—Zeinab El-Arini
Attorney, Agent, or Firm—Burns, Doane, Swecker & Mathis

[57] ABSTRACT

A process for distributing ultra high purity gases with minimized contamination and particulates including; (a) purging said distribution network or any part thereof with dry inert high purity gas comprising less than 1 ppm of any impurity; (b) evacuating said distribution network or any part thereof at a pressure which is lower than $5 \times 10^4$ Pascal; (b') optionally wet cleaning a gas distribution network or any part thereof with a wet cleaning agent, thereafter (c) liquid drying the gas distribution network or any part thereof with an $H_2O$ desorbing liquid drying agent selected from the group including acetone dimethylacetal DMP, 2-2 dichloropropane DCP or 2-2 dibromopropane DBP, mixtures thereof and any equivalent thereof, and (d) distributing an ultra high purity gas through the distribution network or any part thereof.

25 Claims, 5 Drawing Sheets

CYLINDER VALVE HEAD ASSEMBLY

PROCESS FOR DISTRIBUTING ULTRA HIGH PURITY GASES WITH MINIMIZED CONTAMINATION AND PARTICULATES

FIELD OF THE INVENTION

The present invention relates to the distribution of ultra high purity electronic specialty gases. More particularly, the present invention relates to a process for distributing ultra high purity gases with minimized contamination and particulates.

BACKGROUND OF THE INVENTION

The use of ultra high purity of chemicals, in particular of chemical gases, used in the processing of electronic materials (known as electronic specialty gases or ESG) is known to be a key factor in achieving acceptable production yield, production reproducibility and high quality in the manufacturing of electronic devices. For a recent review, see e.g., M. Liehr and G. W. Rubloff, J. Vac, Sci, Technol. B 12, 2727 (1994) which is hereby incorporated by reference.

Even if high purity is achieved at the manufacturing and purification step of such chemical gases, it is known that contamination occurs easily during their flowing to the point of use, through an equipment network (also referred to as a gas distribution network) which can include large lengths of tubing and many components for the control of pressure and flow rate (e.g. pressure reducers, valves, mass-flow controllers, filters, purifiers, etc.) which have to be interposed between the source (e.g. a gas cylinder in a gas cabinet) and the point of use (e.g. the process reactor) as well as other components well known to those of ordinary skill in the art.

Therefore, elaborate development efforts have been devoted to the optimization of the materials, surfaces, assembling techniques and design of line construction in order to achieve a minimal developed area to which the gases will be exposed. Such developments include electropolished metal surfaces, the absence of deadspaces in the distribution line design. Other developments have been directed to minimizing sources of contamination (e.g. optimization of welding technologies to reduce particle emission).

However, even under such elaborate conditions, microcontamination may still occur at minute levels.

The current objective in purity of ultra clean electronic specialty gases to be delivered at point of use is in the range of 1 to 100 ppb (parts per billion) for any volatile impurity, particulate density lower than 1 particulate per liter (under normal conditions) and metal concentrations of less than 100 ppt (parts per trillion) for any metallic element present.

A major mechanism of microcontamination in the above considered purity range arises from the difficulty of completely removing adsorbed molecules from the surface of the materials exposed to the electronic specialty gases, and in particular of moisture, which is widespread in the environment and presents a particularly strong adsorption energy to surfaces.

It has been determined that many of the electronic specialty gases tend to react with such adsorbed molecules, particularly $H_2O$ adsorbed on metallic surfaces, for instance, though a catalytically activated chemical reaction, which promotes the formation of volatile by-products in the considered concentration range and/or also solid particulates (see A. Bruneau et al., Abstract 30p-ZL-13, p. 54, Spring Conf. Jap. Appl. Phys, Soc., March 1994 which is hereby incorporated by reference).

The common procedure carried out to clean such a gas distribution network is to flow ultra-high purity inert gas (e.g. nitrogen or argon of purity better than 1 ppb) in order to purge all impurities present in the volume or at the interior of the gas distribution network. This procedure may nevertheless be unsatisfactory for strongly adsorbed molecules, e.g. $H_2O$ molecules adsorbed on solid surfaces.

This purge procedure can be improved and shortened in duration by using successive pressure-vacuum cycles of the inert gas and additionally by heating the surface in order to induce thermal desorption of the strongly adsorbed molecular species. However, vacuum-pressure purge cycles alone prove inefficient in locations representing deep deadspaces because of the inefficiency of pumping through minute orifices. Thermal baking at 120° C. during the purge of metallic surfaces significantly reduces the time to reach the background level of the purge gas. For example, one can obtain 1 ppb purity in a few hours when flowing ultra high purity (<1 ppb impurity) nitrogen or argon at 0.1–10 standard liters per minute through a gas distribution network free of microleaks of a length between about 10 and about 200 meters. However, it is also known that the thermal desorption of $H_2O$ on an electropolished stainless steel surface occurs in several steps, the last one being at temperature of the order of 400°–450° C. Such a temperature is difficult to apply in practice. Hence, when lower baking temperatures are applied, e.g. frequently 120° C. for practical reasons, the metal surface is not entirely free of adsorbed moisture. Moreover, thermal baking cannot be applied in practice under some circumstances for safety, regulation or material stability reasons.

Others have attempted to improve the purge procedure of the gas distribution network, using for instance a larger number of vacuum-pressure cycles, or increasing the flow rates of the ultra high purity gases. Although this may decrease the initial concentration of the generated impurities and particulates, the time required to reach the background level is always quite long, i.e. about 40 minutes at 40 sccm flow rate and about 15 minutes at 30 sccm flow rate in the apparatus depicted in FIG. 2.

One of the problems encountered when distributing ultra high purity gases in pipes, valves, mass flow controller or the same, which are usually used in the distribution of chemical gases or other gases commonly used in the electronic industry to manufacture integrated circuits, is that those distribution systems comprise or may comprise rough surfaces, which may include deposited or adherent particulates. Even more importantly, those distribution systems usually comprise so-called deadspaces (e.g., in valves, etc.) wherein the vapor phase gas drying has not been very satisfactory.

Unexpectedly, according to the present invention and as explained hereinafter, the liquid phase processing has been proven, under certain conditions, to be much more satisfactory, particularly for rough surfaces and deadspaces encountered in the gas distribution systems such as those used in the semiconductor industry. One of the possible explanations given by the inventors (who, however, do not want to be bound by any theory) is that the wet drying agents used in accordance with the present invention may have, due to their liquid state (and the pressure needed to circulate them) not only a drying (cleaning) effect coming from their chemical formula but also a mechanical cleaning effect due to their liquid state which adds up to their chemical effect and thus provide improvement.

It is, therefore, an object of the present invention to provide another technology to more effectively clean the internal surfaces of a gas distribution network, particularly for deep deadspace locations or those which cannot be heated for thermal desorption because of practical, hazardous or regulatory conditions.

It is another object of the present invention to provide a process for the removal of adsorbed molecules, particularly $H_2O$, before introducing electronic specialty gases into a distribution network, in order to suppress the above source of microcontamination of volatile or particulate impurities.

Another object of the present invention is to provide a process for the operation of a gas distribution network wherein the intrusion of any moisture or air is minimized and any intruded molecules are removed.

It is yet another objective of the present invention to provide a process for minimizing contamination in the distribution of ultra high purity gases.

It is further an objective of the present invention to provide a process for minimizing particulates in the distribution of ultra high purity gases.

It is still another objective of the present invention to provide a process for the removal of $H_2O$ adsorbed to the ultra high purity gas communication surfaces of a gas distribution network.

It is further an objective of the present invention to provide an apparatus for carrying out a process for minimizing contamination and particulates in the distribution of ultra high purity gases.

SUMMARY OF THE INVENTION

Each of the foregoing objectives are achieved by a process for distributing ultra high purity gases with minimized contamination and particulates including; (a) purging said distribution network or any part thereof with dry inert high purity gas comprising less than 1 ppm of any impurity; (b) evacuating said distribution network or any part thereof at a pressure which is lower than $5 \times 10^4$ Pascal; (b') optionally wet cleaning a gas distribution network or any part thereof with a wet cleaning agent, thereafter (c) liquid drying the gas distribution network or any part thereof with an $H_2O$ desorbing liquid drying agent selected from the group comprising acetone dimethylacetal DMP, 2-2 dichloropropane DCP or 2-2 dibromopropane DBP, mixtures thereof and any equivalent thereof, and (d) distributing an ultra high purity gas through the distribution network or any part thereof.

DETAILED DESCRIPTION OF THE PREFERRED EMBODIMENTS

The process of the present invention includes (a) purging a distribution network or any part thereof with dry inert high purity gas comprising less than 1 ppm of any impurity; (b) evacuating said distribution network or any part thereof at a pressure which is lower than $5 \times 10^4$ Pascal; (c) liquid drying the gas distribution network or any part thereof with an $H_2O$ desorbing liquid drying agent selected from the group consisting of acetone dimethylacetal DMP, 2-2 dichloropropane DCP or 2-2 dibromopropane DBP or mixtures thereof or any equivalent thereof, and (d) distributing an ultra high purity gas through the distribution network or any part thereof.

The present invention provides a procedure for contamination free, i.e. volatile reaction byproducts-reduced and particulates-reduced, electronic specialty gases distribution based on the improved removal of moisture adsorbed on metal surfaces and other surfaces. The process of the present invention is particularly well suited for the problem of contamination originating from a cylinder valve since thermal desorption of the species adsorbed in the cylinder valve is prevented by safety and regulation considerations.

The process of the present invention first includes purging said distribution network or any part thereof with a dry inert high purity gas comprising preferably less than 1 ppm of any impurity and more particularly less than 1 ppm water vapor. After purging and venting the purging gas, then the distribution network is evacuated to sub-ambient pressure. These two first steps are repeated until a pressure of less than $5 \times 10^4$ Pascal is reached, with an impurity content in the gas vented which is similar to that of the inert gas injected to purge. These steps (repeated as many times as necessary) are known as "cycled pressure-vacuum" purging. Results obtained after several pressure-vacuum purging are shown, e.g. on FIGS. 3 and 4, curves (2). After these two steps, the gas distribution network is optionally wet cleaned. This wet cleaning step is optional, because the purpose of this wet cleaning step is essentially to remove particles deposited previously by the flow of electronic specialty gas in the gas distribution network, but also to remove any volatile impurities on the surface from the previous flow of ESG in the network. It is thus not necessary to carry out this wet cleaning step with a new distribution network. This optional wet cleaning is accomplished with a high purity liquid such as DI water, alcohols, acetone or other similar cleaning agents known to those of skill in the art. The wet cleaning removes molecular species soluble in these liquids or removes by dilution or liquid mechanical friction molecular species and particulates which may reside on the surfaces before the below described wet drying. Thus, wet cleaning of the gas communicating surfaces of the various components of the gas distribution network removes surface impurities (molecules or particulates). The wet cleaning agents used in this step of the process according to the invention shall be high purity cleaning agents suitable for cleaning metallic surfaces, particularly stainless steel surfaces. By high purity, it is meant cleaning agents which, when they are used pure (or in admixture with other cleaning agents or solvents) do not leave substantial solid residues on the treated surface, i.e. comprising less than 1 mg. of solid residue per liter and preferably less than $10^{-6}$ g of solid residue per liter.

Figure 1:
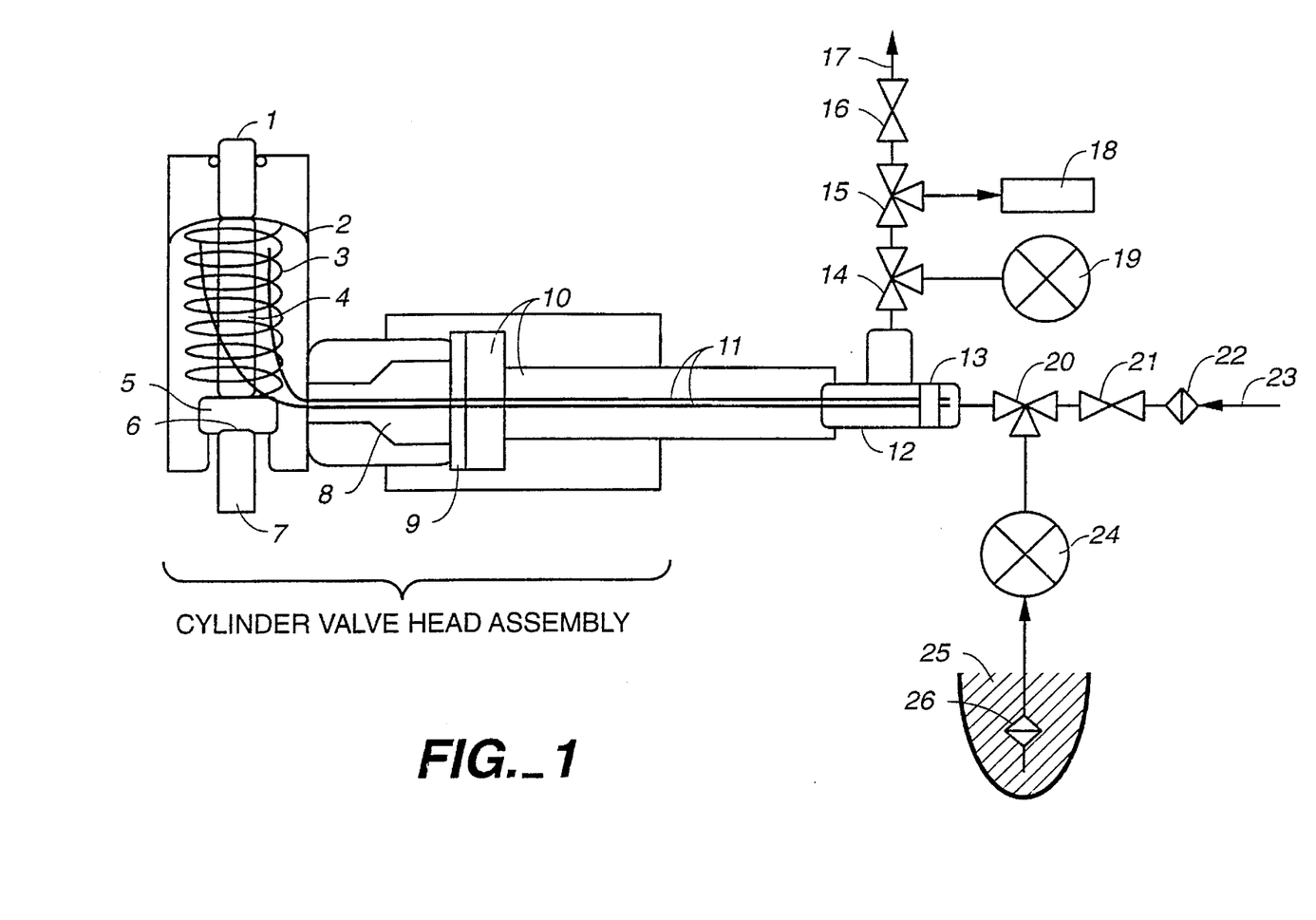
FIG. 1 illustrates an apparatus for carrying out the process of the present invention.

The injection of the cleaning liquid agent is made by any appropriate means such as disclosed hereafter with FIG. 1. This injection can be done either manually with a syringe or automatically with a pump through capillary tubes.

The duration of this wet cleaning step is usually between about 1 mn. to at most 1 hour. If the pipes and other components are new (i.e. have never been used before), it is usually not necessary to wet clean them. However, if it is believed that some particles or condensible molecules may have already adhered, wet cleaning during about 1 mn. to about 2 mn. is sufficient. If the pipe distribution network and/or other components of the network have already been used before, it is usually recommended to clean them between about 5 to about 30 mn., preferably about 10 mn.

Of course, this cleaning is applicable to pipings, valves, mass flow controllers and the like. As a new or existing gas distribution network, it is advisable to provide the process according to the invention each time, as an internal surface of the network shall be in contact with air. For example, when a cylinder is filled in a plant with an electronic specialty gas, it is recommended to clean/dry the valve as explained in the present specification at the end of the filling step. When the cylinder is delivered in the plant of the customer, it is also recommended to apply to said valve of said cylinder the process as disclosed in this specification particularly steps (b') and (c). Also, when the cylinder is withdrawn from the gas cabinet when it is empty, the same procedure should apply. Purging with inert gas between the wet cleaning step (b') and the drying step (c), even if recommended, is usually optional.

The optional wet cleaning step (b') is then followed by a step comprising a liquid drying of the gas communicating surfaces of the gas distribution network through exposure to chemicals which react with adsorbed moisture and leave neither particulate residues nor volatile molecules adherent to the metal or other surface. This wet-drying step is intended to prevent any catalytic reaction of decomposition by water of the electronic specialty gases which flow through the distribution network. Liquid drying according to the present invention can be effectively completed at room temperature using a liquid chemical which preferably removes adsorbed $H_2O$ and which will leave neither particulate residue nor volatile residue (liquid/vapor) but being chemically active with adsorbed moisture. (No particulate residues means that the liquid contains usually less than 1 mg and preferably less than $10^{-6}$/g of particulate material per liter). These liquid chemicals are hence easily purged out under vacuum-pressure cycles after the liquid drying.

The duration of this liquid drying step is preferably between about 1 mn to about 20 minutes. Usually, if the device or piping distribution network is new and the roughness of the internal surface of the same is less than $5\times10^{-6}$m (Ra$<5\times10^{-6}$m), about 1 to about 2 minutes are usually enough. However, if the device, piping or network are not new and particularly if the roughness of the surface Ra is greater than $5\times10^{-6}$m, then it is usually recommended to treat with the drying agent during about 10 minutes or more.

According to the invention, the $H_2O$ desorbing liquid drying agent is selected from the group consisting of DMP (acetone dimethyl acetal), DCP (2-2-di-chloropropane) or DBP (2-2 dibromopropane), any mixture thereof and any equivalents thereof. An equivalent is herein defined as any liquid which can react with adsorbed moisture and leaves neither substantial particulate residues nor substantial volatile molecules adherent to the metal or other surface and which function is to prevent any catalytic reaction of decomposition by water of the electronic specialty gases which flow through the distribution network. It is most preferred to use pure liquids, in order to combine the wet-cleaning properties and chemical-drying properties of these molecules.

According to one aspect of the present invention, it has been unexpectedly discovered that the three above drying liquids (DMP, DCP or DBP), when used after the cleaning step disclosed hereabove, were extremely effective and that it cannot be accurately predicted whether other molecules of other $H_2O$ desorbing liquid drying agent can be used successfully.

Usually thereafter, purging of any residual by-product is accomplished preferably by pressure-vacuum cycle purge using ultra high purity inert gas as defined hereabove.

In an especially preferred embodiment of the present invention, the gas distribution network is purged with an inert gas such as nitrogen, argon, helium or with a reductive gas such as hydrogen, after the wet cleaning and liquid drying steps have been completed and before the delivery of the Electronic Specialty Gas (ESG). The duration of purging may vary between about 1 minute to about 10 minutes, preferably between 2 to 5 minutes. The gas used for such purging has to be of course extremely pure, i.e. less than bout 100 ppb of volatile impurities and less than one particle per liter in normal conditions of temperature and pressure. (This purging with the above gases is usually carried out with alternate vacuum).

Next, an Electronic Specialty Gas (ESG) is introduced into the gas distribution network, such as: $SiH_4$, $SiH_2Cl_2$, $SiF_4$, $Si_2H_6$, $Si_3H_8$, $BCl_3$, $BF_3$, $B(CH_3)$, $B_2H_6$, $PH_3$, $P(CH_3)_3$, Phosphorus organics (Butyl, etc.), $AsH_3$, As organics, organometallics of Al, Cu, Ta, W, $WF_6$, $MoF_6$, $UF_6$, $TaCl_4$.

In another embodiment of the present invention, after flowing the ESG for the manufacturing process, such as I.C. manufacturing, the wet cleaning and the liquid drying steps (b') and (c) of the present invention are additionally performed just after purging the ESG from the distribution network and before exposing the network, even very briefly, to air. This reduces the occurrence of unwanted chemical reaction between residual adsorbed ESG and $H_2O$ molecules, which will occur after air exposure. Indeed, such reactions between adsorbed species are again catalytically activated and promote surface reaction leading to corrosion, particulates and formation of unwanted surface molecules.

In yet another embodiment of the present invention, two cycles or more of wet cleaning (e.g. the first using e.g. Di water—less volatile—the second using e.g. acetone or alcohol—more volatile) and at least one cycle of wet drying are completed. This sequence is particularly effective both before and after any exposure of a gas communicating surface of the gas distribution network to an ESG, particularly when the surface has been exposed air.

Among the many appropriate uses for the process of the present invention, it is intended for use before (a) any exposure (even for a minimal time) to air and (b) before flowing the ESG through the gas distribution system or any part thereof.

The above process can be applied to a total gas distribution network. However, the most critical parts are those involving deep deadspaces such as found in a valve construction or other components such as mass flow controllers, pressure regulators, etc. Accordingly, the present invention is specially directed to such components in the gas distribution network.

Although the cleaning and drying operations can be carried out manually, it is also provided hereunder an apparatus for carrying out the process of the present invention, including a means for wet cleaning the gas distribution network with a wet cleaning agent and a means for liquid drying the gas distribution network with an $H_2O$ desorbing liquid drying agent. Although the means for wet cleaning and the means for liquid drying can be accomplished with a single means, two separate means can be used. That is the apparatus to carry out the process of the present invention can include a single system for wet cleaning and liquid drying or two systems, one for wet cleaning and one for liquid drying.

According to one embodiment, the wet cleaning and/or liquid drying agent can be introduced into the gas distribution network manually using a syringe type introduction system known to those of skill in the art, and further described hereafter.

In another embodiment, the circulation of the wet cleaning and/or liquid drying agents is achieved by the use of a circulation pump which circulates the cleaning liquid through the whole distribution network and then further circulates the wet drying liquid through the same network. According to a further embodiment wherein essentially the devices like valves, mass flow controllers, etc. of the distribution network are cleaned according to the process of the invention, the injection of the liquids (cleaning and/or drying) is preferably carried out through the use of capillary tubing as disclosed on FIG. 1, wherein it is provided a mechanically activated liquid circulation system designed to reach deep deadspaces within the components of the gas distribution network in implementing the process of the present invention. The system is based on a pump to provide liquid flow, capillary inlet and outlet lines to provide minute deadspaces and an assembly allowing clean fluid handling and minimal air exposure on connection and disconnection. The apparatus of Figure is further described below.

The cylinder valve head assembly of FIG. 1 includes a cylinder valve 1, diaphragm 2, spring 3, spindle 4, polymeric sealing material such as Diflon, Teflon or others 5, cylinder valve port 6, gas flow from cylinder 7 (for example HBr), outlet of cylinder valve 8, polymeric packing 9 and fitting and connector 10.

The cylinder valve head assembly is in fluid communication with a length of capillary tubing 11 and a first end of a "T" type male connector 12. A first end of a three-way diaphragm valve for wet cleaning and/or liquid drying inlet 20 is in fluid communication with a second end of the "T" type male connector 12. We use ceramic cement as a vacuum-tight, non-reactive and non-outgasing metal-metal bonding agent.

A liquid pump 24 is in fluid communication with a second end of the three-way diaphragm valve for wet cleaning and/or liquid drying inlet 20. Liquid pump 24 is further in fluid communication with a 0.1 μm filter 26 and wet cleaning agent or liquid drying agent 25.

A third end of the three-way diaphragm valve for wet cleaning and/or liquid drying inlet 20 is in fluid communication with diaphragm valve 21 which is in further communication with 0.1 μm filter 22 and dry gas inlet 23. Dry gas inlet 23 is used for the introduction of purge gases (inert or reductive, usually used between the cleaning step and the drying step).

A third end of the "T" type male connector 12 is in fluid communication sequentially with a three-way diaphragm valve for evacuation 14 by oil free vacuum pump 19, a three-way diaphragm valve 15 for moisture monitor by hygrometer 18, a diaphragm valve 16 and a vent line 17 for wet cleaning and/or liquid drying which is connected to recovering means (not shown in the drawing) to recover those products after being used.

In operation, the apparatus of FIG. 1 is operated as follows:

1. Close cylinder valve;
2. Open valve 16, close valve 14, 15, 20 and 21;
3. Insert capillary tubes into cylinder valve;
4. Connect apparatus to cylinder valve outlet (8) by the connector (10);
5. Open valve 20 and switch on the pump (24) (automatic) or a syringe (manual), and send cleaning liquid (25) to cylinder valve through capillary tubes;
6. Monitor the color or pH of vent liquid;
7. Continue to clean until vent liquid become colorless of pH7;
8. After cleaning, change the vessel filled with dry chemical agent, and introduce dry chemical agent into cylinder valve;
9. After introducing of dry chemical agent, switch off the pump (24) and close valve 20;
10. Open valve 21 and introduce dry gas and purge the line until no liquid is observed at vent line (17);
11. If very short dry-down time is necessary, close valve 16, 21, and open valve 14, and evacuate cylinder valve by vacuum pump (19);
12. Close valve 14 and open valve 16, 21, and purge cylinder valve by dry gas;
13. Open valve 15 and close valve 16, and monitor moisture concentration in dry gas by hygrometer;
14. Continue to dry down cylinder valve by moisture concentration of <1 ppm;
15. Disconnect the connector (10) of apparatus and introduce of small amount of dry agent into cylinder valve, then put blind cap for cylinder valve.

Accordingly, the present invention provides a gas distribution process with minimized contamination and particulates. This process including the use of a wet cleaning agent and an $H_2O$ desorbing liquid drying agent, thoroughly removes $H_2O$ adsorbed to the gas communication surfaces of the gas distribution system as well as volatile and other impurities present in the network. The thorough removal of adsorbed $H_2O$ reduces undesirable reactions with the specialty gases that result in the generation of particulates, contaminants and corrosion. Accordingly, the present invention provides for the improved delivery of ultra high purity gases at the point of use.

In order to further illustrate the present invention and the advantages thereof, the following specific example is given, it being understood that same is intended only as illustrative and in nowise limitative.

EXAMPLE

Figure 2:
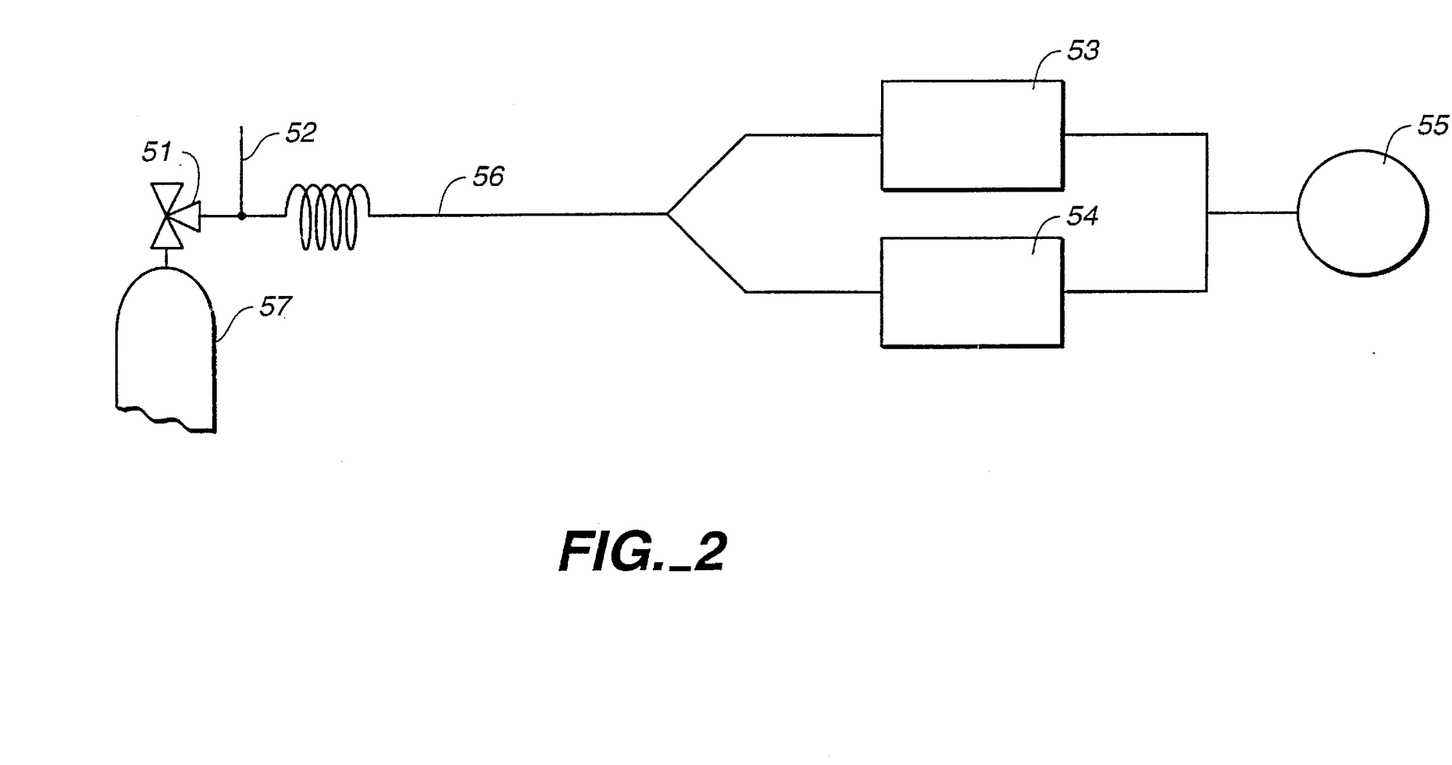
FIG. 2 illustrates an apparatus for the analysis of contaminants and particulates encountered in the delivery of ultra high purity electronic specialty gases.

As an example on how to use the present invention, the gas distribution network of FIG. 2 has been used for the distribution of ultra high purity dichlorosilane.

In FIG. 2, high purity dichlorosilane (comprising less than 1 ppm of volatile impurities and less than 1 particle per liter of gas at normal conditions) is emitted from a gas cylinder 57 through a cylinder valve 51 in fluid communication with a tube for gas circulation 56, an analyzer for volatile species 53 and a particle counter 54. Detoxication means 55, i.e. an instrument which absorbs process gases in order to avoid their release into the environment, is further in fluid communication with the analyzers exit. Optionally, an inert gas purge can be introduced via inert gas purge connection 52.

Figure 3:
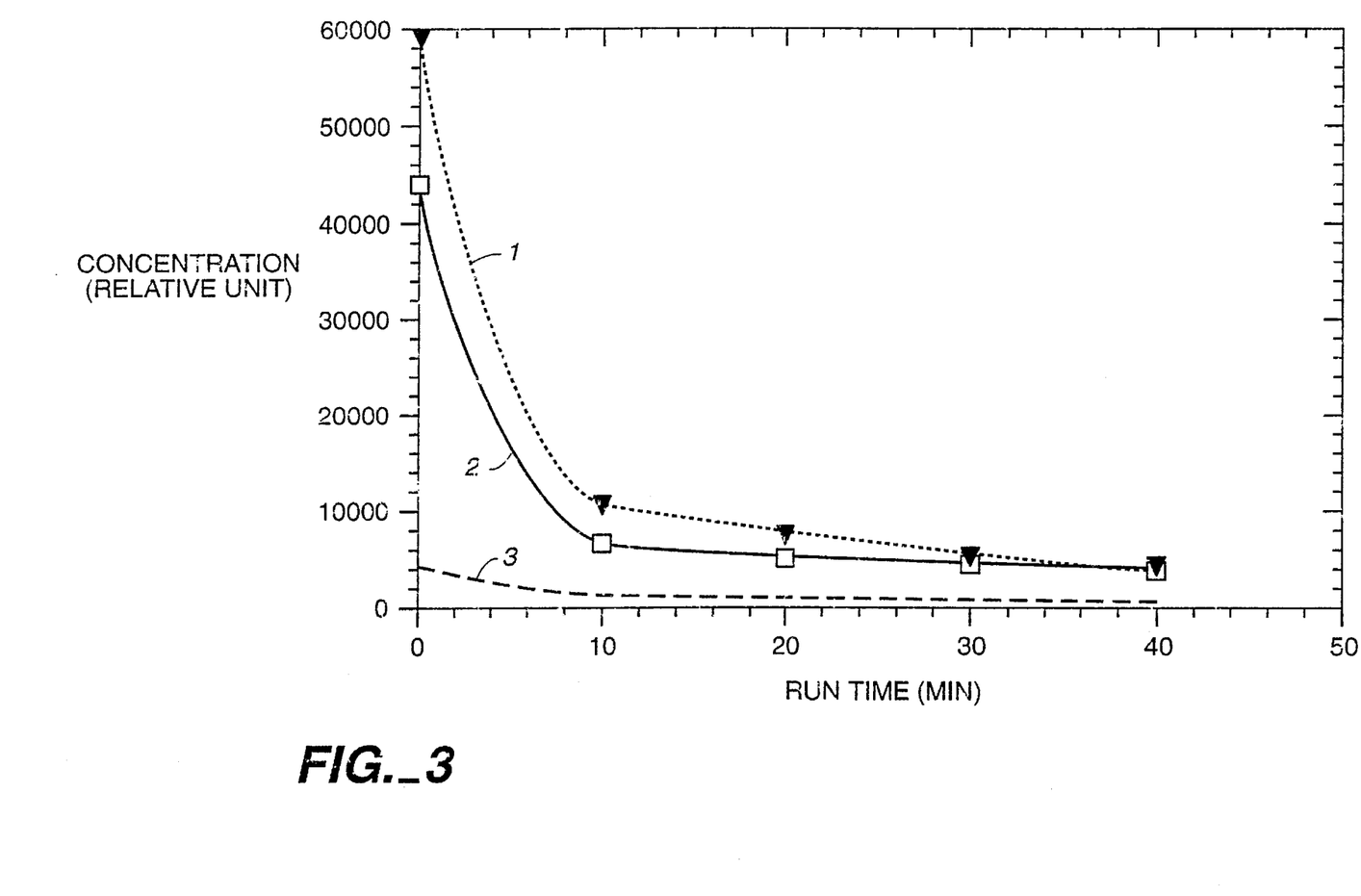
FIG. 3 is a comparative graph depicting the decrease of $(SiH_2Cl)_2O$ contaminant in $SiH_2Cl_2$ formed as a reaction by-product in the gas distribution line of $SiH_2Cl_2$ over time as analyzed with the apparatus of FIG. 2, after the use of the process according to the invention compared to prior art techniques.
Figure 4:
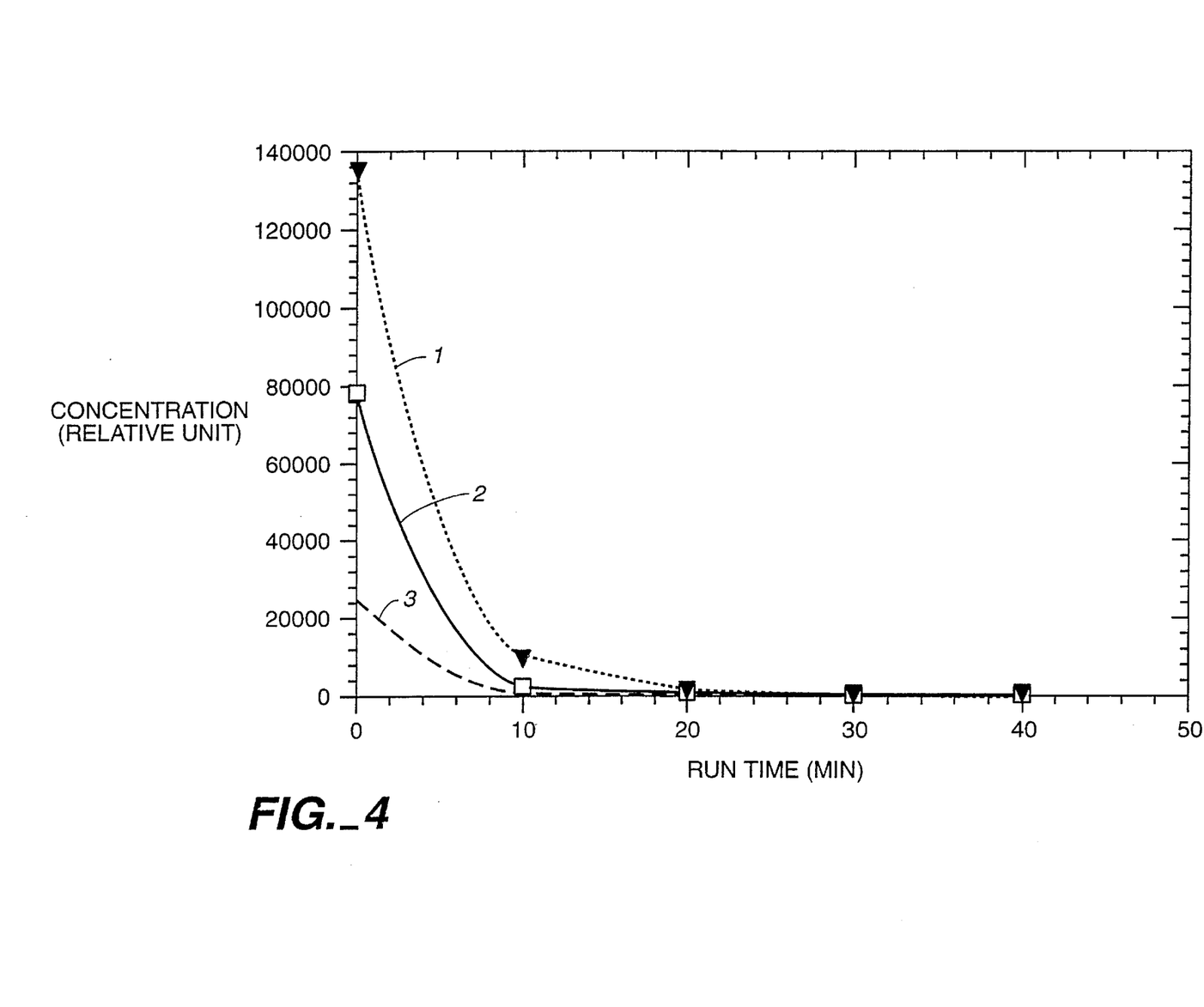
FIG. 4 is a comparative graph depicting the decrease of HCl contaminant in $SiH_2Cl_2$ (formed as a reaction by-product in the $SiH_2Cl_2$) over time as analyzed with the apparatus of FIG. 2, after the use of the process according to the invention compared to prior art techniques.
Figure 5:
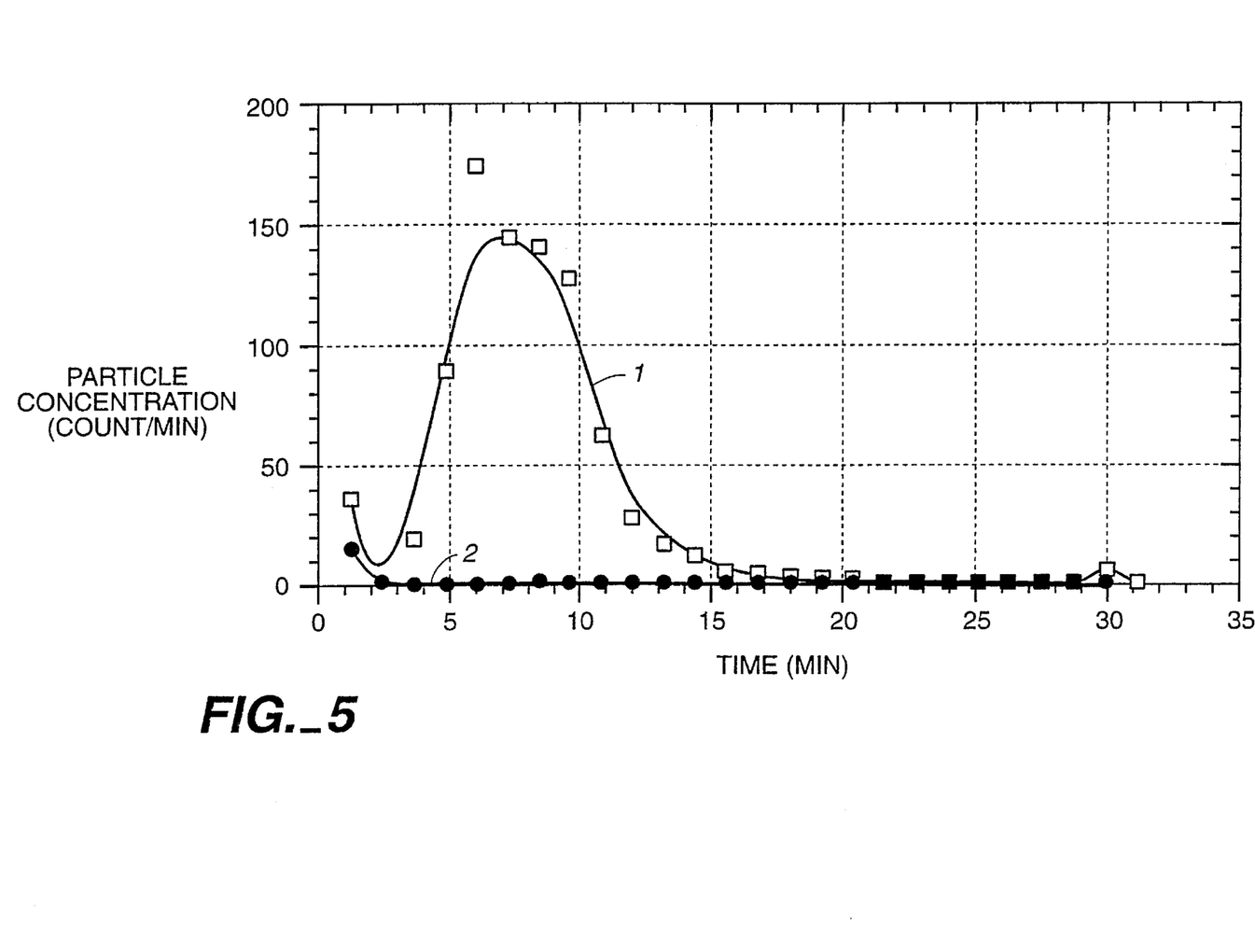
FIG. 5 is a comparative graph depicting the presence of particulates over time as analyzed with the apparatus of FIG. 2 (a) after use of the process of the present invention and (b) without the use of the process of the present invention.

Under conventional operating conditions, including vacuum cycle purging on cylinder connection, when the gas flows through a short network as depicted in FIG. 2 to the analyzers, initially a number of molecular species, due to reactive degradation of $SiH_2Cl_2$ on exposure to gas handling components, are observed to contaminate the gas reaching the analyzer and their concentration decreases progressively with time as set forth in the graphs of FIGS. 3 and 4 respectively on curves (1) and (2) of each FIGS. 3 and 4. These decomposition products are for instance HCl and $(SiH_2Cl)_2O$ as disclosed in the article of A. Bruneau et al. referred to hereabove. Finally, after flowing the gas for typically 1 hour or more, the level of contaminants becomes stable, corresponding to the high purity of the cylinder gas. The same behavior is observed when counting particulates, with a high initial number, decreasing to zero after about 15 minutes or more of gas flow at about 30 standard cubic centimeter/minute as set forth in FIG. 5, on curve (1), top. These conditions are explained, at least in part, by the presence of adsorbed moisture on the metals parts exposed to air, which reacts with $SiH_2Cl_2$ to generate above-mentioned impurities in volatile and particulate forms. As depicted in the graphs 3 and 4, the concentration of molecular species observed over time is somewhat reduced by additional pressure vacuum purging [curves (2) respectively].

In the examples hereabove, we used:

a) Wet cleaning with acetone for 10 minutes (less than 1 mg/liter of solid residues);

b) High purity $N_2$ purge for 3 minutes (less than 100 ppb volatile impurities, less than 1 particle per liter in normal conditions);

c) Wet drying with DMP for 10 minutes (less than 1 μg/liter of solid residues).

In order to illustrate the effectiveness of the invention, the following experiments have been carried out, using the same experimental device of FIG. 2 and using the device and process disclosed in FIG. 1 to clean/dry the cylinder valve head assembly of cylinder valve 1. First of all, a 10 times pressure vacuum purge was applied to this assembly as performed previously, followed by:

A wet cleaning step with high purity acetone for about 10 minutes, said acetone being of high purity, i.e. comprising less than $10^{-6}$g of solid particulate per liter, then A high purity nitrogen purge for about 10 minutes, said high purity nitrogen comprising less than 100 ppb of volatile impurities per liter and less than 1 particle per liter, under standard conditions of temperature and pressure;

A wet drying with high purity DMP for about 1 minute, said high purity DMP comprising less than about $10^{-6}$g of solid particulates per liter and less than 100 ppb of volatile impurities per liter, standard conditions. Then, the cylinder valve head assembly is vacuum purged, then purged with high purity inert gas (or hydrogen) having the same characteristics as the gas used hereabove in the second step. The results obtained are shown on FIGS. 3 and 4 [curves (3)] which shows that the equilibrium level are reached in a much shorter time (and at a lower level) than with the previous techniques. Also on FIG. 5, curve (2) is about immediately flat, which means that the equilibrium in particle count is reached very fast and at a considerable lower level.

What is claimed is:

1. A process for distributing ultra high purity gases in a gas distribution network with minimized contamination and particulates, comprising the steps of: (a) purging said distribution network or any part thereof with dry inert high purity gas comprising less than 1 ppm of any impurity; (b) evacuating said distribution network or any part thereof at a pressure which is lower than $5\times10^4$ Pascal; (c) liquid drying the gas distribution network or any part thereof with $H_2O$ desorbing liquid drying agent selected from a group consisting of acetone dimethylacetal, 2-2 dichloropropane or 2-2 dibromopropane, mixtures thereof and any equivalent thereof; and, (d) distributing an ultra high purity gas through the distribution network or any part thereof.

2. The process according to claim 1, further comprising a step (b') of wet cleaning the gas distribution network or any part thereof with a wet cleaning agent, said step being carried out between steps (b) and (c).

3. The process according to claim 2, wherein the step of wet cleaning is carried out for about 1 mn to about 1 hr.

4. The process according to claim 2, using a distribution network of ultra high purity gas comprising essentially components or parts thereof which have never been used before, wherein said wet cleaning step is carried out for about 1 mn to about 2 mn.

5. The process according to claim 2, using a distribution network of ultra high purity gas comprising essentially components or parts thereof which have been used at least once before, wherein said wet cleaning step is carried out for about 5 to 30 minutes.

6. The process according to claim 2, wherein said wet cleaning agent is a liquid comprising less than 1 mg per liter of particulate material.

7. The process according to claim 2, wherein said wet cleaning agent is a liquid comprising less than $10^{-6}$ g. per liter of particulate material.

8. The process according to claims 6 or 7, wherein said wet cleaning agent is selected from a group comprising deionized water, isopropyl alcohol, acetone or mixture thereof.

9. The process according to claim 2, further comprising repeating steps (b') and (c) before carrying out step (d).

10. The process for distributing ultra high purity gases of claim 2, wherein said gas distribution network includes at least one cylinder valve.

11. The process according to claim 10, wherein said cylinder valve is submitted at least to step (b') and (c) before and after each contact of its internal surface with ambient air.

12. A process according to claim 2, further comprising purging the gas distribution network or any part thereof with an inert or reductive gas between steps (b') and (c).

13. The process according to claim 1, wherein the step (c) of liquid drying is carried out for about 1 mn to 20 mn.

14. The process according to claim 13, using a distribution network of ultra high purity gas comprising essentially components or parts thereof which have never been used before and having a roughness for their internal surface Ra which is lower than $5\times10^{-6}$m, wherein said liquid drying step is carried out for about 1 to about 2 minutes.

15. The process according to claim 13, using a distribution network of ultra high purity gas comprising essentially components or parts thereof which have been used at least once before and having a roughness of their internal surface Ra which is higher than $5\times10^{-6}$m, wherein said liquid drying step is carried out for about 10 minutes or more.

16. The process according to claim 1, further comprising purging the gas distribution network or any part thereof with an inert or reductive gas between steps (b) and (d).

17. The process according to claim 16, wherein said inert or reductive gas is selected from the group comprising nitrogen, argon, helium or hydrogen.

18. The process according to claims 16 or 17, wherein said inert or reductive gas comprises less than 100 ppb of volatile impurities and less than 1 particle per liter under standard conditions of temperature and pressure.

19. The process according to claim 1, further comprising purging the gas distribution network or any part thereof with a high purity inert gas after step (d) and before exposing to ambient air the said gas distribution network or any part thereof.

20. The process for minimizing contamination and particulates in the distribution of ultra high purity gases of claim 19, further comprising twice wet cleaning the gas distribution network or any part thereof with a wet cleaning agent, and liquid drying the gas distribution network or any part thereof with $H_2O$ desorbing liquid drying agent after step (ii) and before step (iii).

21. A process according to claim 1, wherein ultra high purity gas is an electronic specialty gas.

22. A process according to claim 21, wherein the electronic specialty gas is selected from a group consisting of $SiH_4$, $SiH_2Cl_2$, $SiF_4$, $Si_2H_6$, $Si_3H_8$, $BCl_3$, $BF_3$, $B(CH_3)$, $B_2H_6$, $PH_3$, $P(CH_3)_3$, Phosphorus organics, $AsH_3$, As organics, organometallics of Al, Cu, Ta, W, $WF_6$, $MoF_6$, $UF_6$, $TaCl_4$.

23. A process for minimizing contamination and particulates in the distribution of ultra high purity gases, comprising the steps of sequentially (i) wet cleaning a gas distribution network or any part thereof with a wet cleaning agent, (ii) liquid drying the gas distribution network or any part thereof with an $H_2O$ desorbing liquid drying agent, (iii) purging the gas distribution network or any part thereof with a high purity inert gas, (iv) distributing an ultra high purity gas through the distribution network or any part thereof, (v) purging the gas distribution network or any part thereof with a high purity inert gas, (vi) wet cleaning a gas distribution network or any part thereof with a wet cleaning agent, and (vii) liquid drying the gas distribution network or any part thereof with $H_2O$ desorbing liquid drying agent.

24. The process for minimizing contamination and particulates in the distribution of ultra high purity gases of claim 23, further comprising twice wet cleaning the gas distribution network or any part thereof with a wet cleaning agent, and liquid drying the gas distribution network or any part thereof with $H_2O$ desorbing liquid drying agent after step (vii).

25. The process for minimizing contamination and particulates in the distribution of ultra high purity gases of claim 23, further comprising (viii) exposing the gas distribution network, or any part thereof to ambient air.

* * * * *